(12) United States Patent
Jones

(10) Patent No.: US 7,284,625 B2
(45) Date of Patent: Oct. 23, 2007

(54) QUICK CONNECT ASSEMBLY FOR ATV IMPLEMENTS

(76) Inventor: Kirk Jones, 1553 Via Monserate, Fallbrook, CA (US) 92028

( * ) Notice: Subject to any disclaimer, the term of this patent is extended or adjusted under 35 U.S.C. 154(b) by 196 days.

(21) Appl. No.: 10/971,358

(22) Filed: Oct. 22, 2004

(65) Prior Publication Data

US 2005/0126319 A1 Jun. 16, 2005

Related U.S. Application Data

(60) Provisional application No. 60/513,362, filed on Oct. 22, 2003.

(51) Int. Cl.
*B60K 17/28* (2006.01)
(52) U.S. Cl. .................. 180/53.4; 74/15.2; 60/698
(58) Field of Classification Search ...... 180/53.4–53.8; 74/11, 15.2, 15.6
See application file for complete search history.

(56) References Cited

U.S. PATENT DOCUMENTS

| | | | |
|---|---|---|---|
| 3,522,861 A * | 8/1970 | Knapp et al. ............... | 180/243 |
| 4,191,157 A * | 3/1980 | Shaw ..................... | 123/198 R |
| 5,011,442 A * | 4/1991 | Polcz et al. ................. | 440/113 |
| 5,488,883 A * | 2/1996 | McMillen et al. ..... | 74/665 GC |
| 6,178,668 B1 * | 1/2001 | Gustafson et al. ............ | 37/231 |
| 6,672,414 B2 * | 1/2004 | Laflamme .................. | 180/53.4 |
| 7,013,646 B1 * | 3/2006 | Serkh et al. .................. | 60/698 |

* cited by examiner

*Primary Examiner*—Paul N. Dickson
*Assistant Examiner*—Tiffany L. Webb
(74) *Attorney, Agent, or Firm*—Myers Dawes Andras & Sherman LLP; Joseph C. Andras

(57) ABSTRACT

A quick connect power take-off assembly adapted for an all-terrain vehicle (ATV). The quick connect power take-off assembly includes a housing, a driving assembly that is fixedly mounted to the ATV, a driven assembly that is releasably connected to the driving assembly, and either directly to an implement or to a power transfer assembly. The power transfer assembly includes a rotationally-driven power transfer assembly and a second slip joint coupler connected to the input shaft of the power transfer assembly, and a quick connect plate on the engine-facing side of the rotationally-driven power transfer assembly. The quick connect plate is releasably connected to the power transfer assembly on an outwardly facing side and releasably connected to the second slip joint coupler on an engine-facing side thereof. The power transfer assembly is axially engaged with the engine shaft and receives rotational energy there from.

6 Claims, 5 Drawing Sheets

QUICK CONNECT ASSEMBLY FOR ATV IMPLEMENTS

RELATED APPLICATIONS

The present application is related to U.S. Provisional Patent Application, Ser. No. 60/513,362 filed on Oct. 22, 2003, which is incorporated herein by reference and to which priority is claimed pursuant to 35 USC 119.

BACKGROUND OF THE INVENTION

1. Field of the Invention

The invention relates to the field of quick connect assemblies. In particular, the invention relates to a quick connect assembly for use on all terrain vehicles (ATVs) or the like, for connecting belt and pulley or hydraulic pump driven implements.

2. Description of the Prior Art

All terrain vehicles (ATVs) are typically an all-season vehicle supported by a pair of rear drive wheels coupled through a transmission to a gas powered engine. ATV's have mostly been used for recreational purposes, but ATV manufacturer's have also produced models well-suited as general purpose utility vehicles that are rear wheel or four wheel drive. The initial cost of an ATV has created a need and desire to better put them to use as work vehicles. Various implements have been designed to convert ATVs into more useful vehicles, such as lawn mowers, log splitters, electric generators, etc. However, these attachments have significant drawbacks in that normally, duplicate engines are needed to run the separate implements that may or may not be pulled by the ATV, which is very costly and the redundant engine needlessly weighs down the ATV. Conventional implements are custom installed and are cumbersome and time consuming to utilize in that they are required to be bolted onto the ATV engine and have to be completely unbolted and disassembled to operate the ATV in a normal function.

Accordingly, a need has been developed in the art to provide a quick connect assembly for quickly coupling and decoupling ATV implements to and from the ATV engine and resolving the need for a second engine on the implement.

BRIEF SUMMARY OF THE INVENTION

It is a primary object of this invention to provide a quick connect assembly that avoids one or more of the shortcomings of the conventional related technology. It is therefore an object of this invention to provide a quick connect assembly that allows implements to be quickly coupled to and decoupled from the ATV engine and to provide an existing power source on an ATV to power the implement, alleviating the need for a second engine on the implement. While the present invention is applicable in many types of power implements and to many different vehicles, for the sake of brevity it will be described herein in terms of an apparatus for quickly attaching implements including, but not limited to, a lawn mower, a high pressure washer (i.e. a water sprayer), electric generator, wood chipper, snow blower, air compressor, water pump, post-hole digger and a log splitter.

The preferred embodiment of the invention is attached to a drive shaft at an input end and adapted to be coupled to an implement at an output end. The preferred quick connect assembly is structurally mounted to the auxiliary starter mount on the left side of the ATV engine and coupled directly to the implement or to a power transfer assembly that transfers power to the implement. The preferred quick connect assembly comprises a housing, a drive plate and drive plate coupler, a quick connect plate and a power source. The quick connect plate is preferably in the form of an ear plate, but can take on any structure that allows it to be easily inserted into the housing.

According to one preferred embodiment of the present invention, the quick connect assembly is mounted to an existing output shaft of the ATV which is coupled to a power transfer assembly to provide power to the implement. The power transfer assembly is preferably a hydraulic pump that connects to the ATV crankshaft at an input end and connects to the implement's hydraulic motor at an output end. In this embodiment, the rotational energy is transferred from the crankshaft to the hydraulic pump and hydraulic fluid is then discharged under pressure by the hydraulic pump. The hydraulic fluid flows through a hydraulic circuit to power a hydraulic motor on an implement, creating the need for only one engine between the ATV and the implement.

The power transfer assembly can also be completely mechanical, e.g. a power take off (PTO) shaft that extends outwardly from the ATV to run the implement devices from the existing ATV engine, directly or via a belt drive or the like. In this embodiment, the implements attach directly into the PTO without any hydraulic power required. For this use the ATV would be in neutral, and the engine power is delivered to the power take off shaft.

An adapter can be made for the auxiliary starter unit in the form of a quick connect plate so that it can also be quickly mounted back onto the ATV. The benefits to the present invention over the prior art is the quick connect and disconnect time of attaching the implements to the ATV. During assembly, ATV modification is minimal, and only involves removing the existing auxiliary starter for the ATV. A drive plate, drive plate coupler and housing are bolted onto the ATV. In this stage, the ATV can be used as it was originally designed. Next, a power source coupler is slidably mounted into the drive plate coupler and a quick connect plate is fitted into the housing without the use of bolts or aided attachments. The hydraulic pump or power take off unit is then fixedly attached to the quick connect plate and coupled to the housing by rotating the quick connect plate into the symmetrical fittings in the housing. The receiving side of the assembly can be mounted to an auxiliary starter mount of the ATV engine in just a few minutes, and the implement-side of the assembly can thereafter be connected to or released from the receiving side of the assembly in just a few seconds. When the power source and the quick connect plate are disconnected from the housing, the ATV can be operated as intended.

According to another preferred embodiment, the drive plate coupler can rest against a metal crown that is attached to the ATV end of the crankshaft, and works in place of the disc plate. The metal crown already being in place when an auxiliary starter on the ATV engine is removed. The metal crown includes at least one protruding flange, wherein the drive plate coupler can be adapted to fit onto the crown, eliminating the need for the drive plate While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
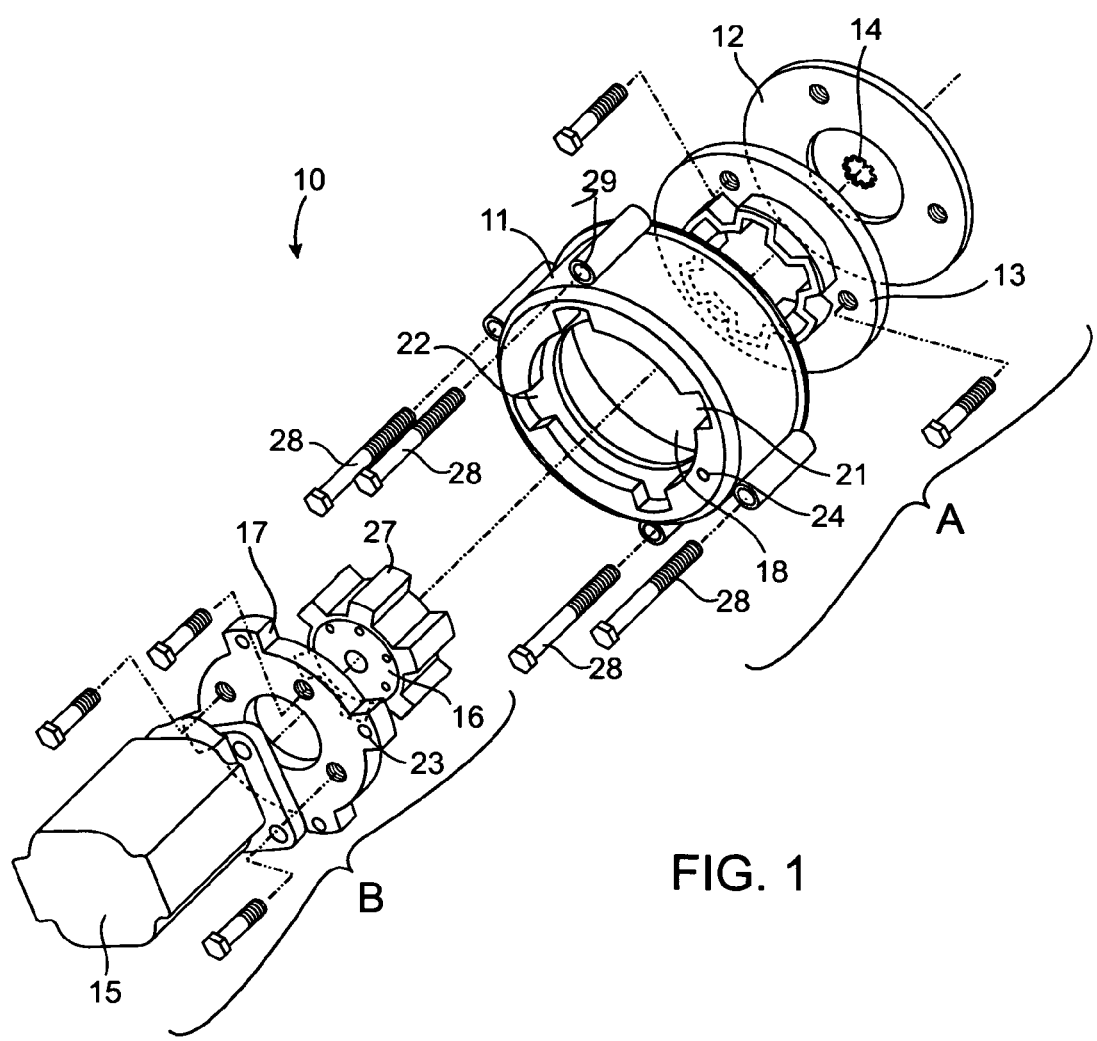
FIG. 1 is an exploded view of an embodiment of the invention.

Referring initially to FIG. 1, a first preferred embodiment of a quick connect power take-off assembly 10 adapted for an all-terrain vehicle (ATV 40) according to the present invention is shown. The quick connect assembly 10 comprises a driving assembly A and a driven assembly B. The driving assembly A comprises a housing 11, a driving assembly that is fixedly mounted to the ATV 40 (shown in FIG. 4), the drive plate assembly including a drive plate 12 and a first slip joint coupler 13 that is attached on an outward-facing side of the drive plate 12. The quick connect assembly 10 is adapted to be connected to an ATV 40 engine with an engine case and an engine shaft that extends from the engine case. The drive plate assembly includes a central aperture 14 that extends axially through the quick connect assembly and is adapted for connection to the engine shaft 35 (shown in FIG. 3) on an engine-facing side thereof.

Figure 3:
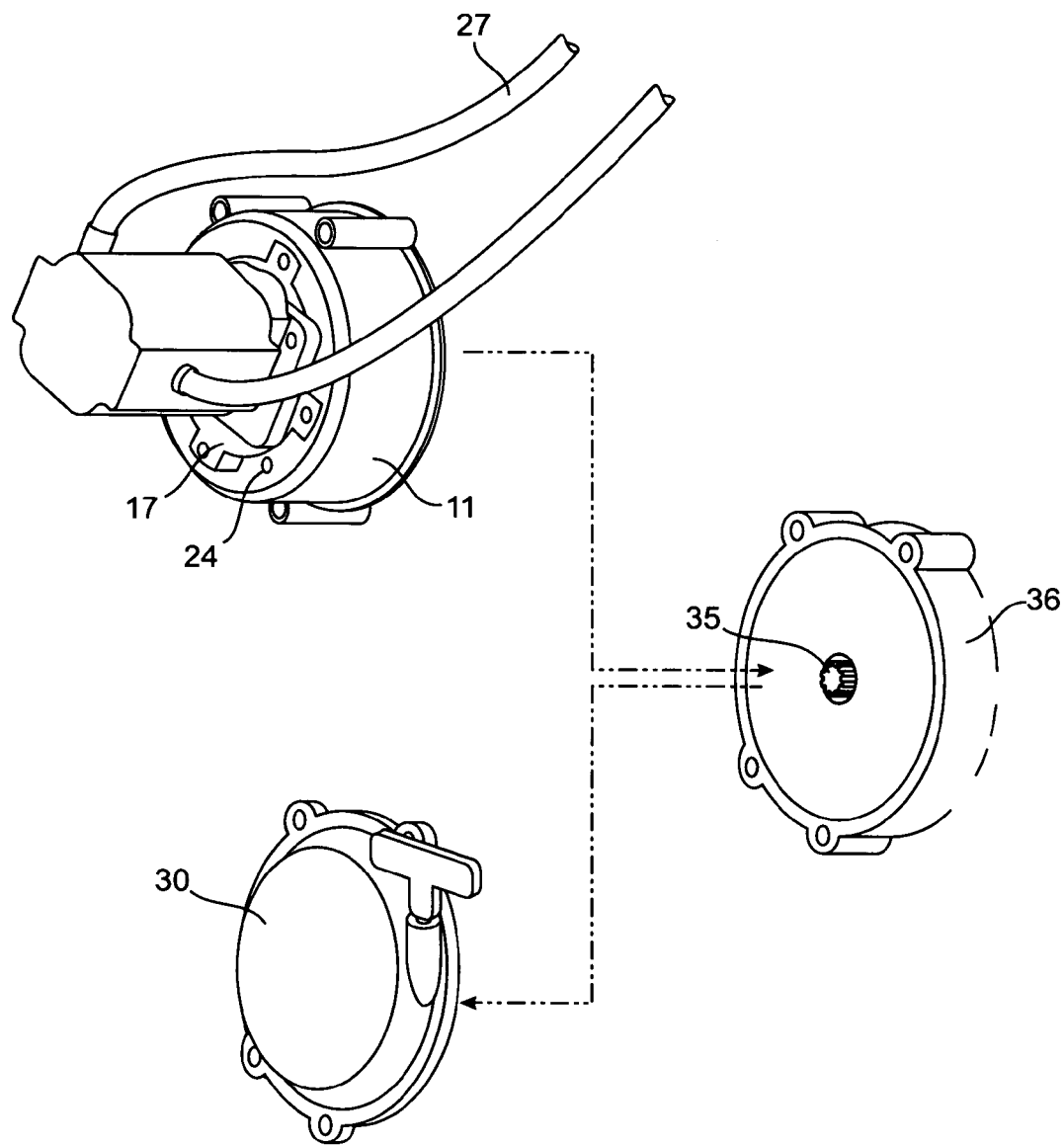
FIG. 3 shows a functional aspect of an embodiment of the invention during installment.

The driven assembly B comprises a power transfer assembly and is releasably connected to the driving assembly A, wherein when the driven assembly B is removed from the ATV 40, only the drive plate 12, first slip joint coupler 13 and housing 11 remain coupled to the engine case 36 (shown in FIG. 3).

The driven assembly B comprises a rotationally-driven power transfer unit 15 with an input shaft (not shown) extending from an engine-facing side thereof, a second slip joint coupler 16 connected to the input shaft of the power transfer assembly, and a quick connect plate 17 on the engine-facing side of the rotationally-driven power transfer assembly. The quick connect plate 17 is connected to a mounting flange of the power transfer unit 15 with suitable fasteners. The preferred quick connect plate includes protruding ears 20 that act as an attachment means for the driven assembly B to be coupled to the driving assembly A on the ATV 40. The preferred quick connect plate has four ears 20, but it is of course possible to use two or more ears, other than four. The ears 20 are matched to and inserted into ear slots 21 on the peripheral of the housing 11, the power transfer assembly being fixedly attached to the quick connect plate 17 and fitted into a circular groove 22 located within the housing 11 on an outward-facing side thereof. The second slip joint coupler 16 is connected to the input shaft of the power transfer unit 15, and when the quick connect plate 17 is connected to the housing 11, the second slip joint coupler 16 includes external splines 27 that are adapted to axially engage the internal splines of the first slip joint coupler 13.

The power transfer assembly is coupled to the ATV 40 by rotating the quick connect plate 17 within the circular groove 22 of the housing. The quick connect plate 17 includes a first locking aperture 23 on at least one of the ears 20 adapted to be aligned with a second locking aperture 24 located on the housing 11 and outwardly from the circular groove 22. The first and second locking apertures 23, 24 are adapted to receive a locking pin 25 that holds the quick connect plate 17 in place preferably in connection with the rotation of the engine shaft. Alternatively or additionally to the locking apertures 23, 24 and locking pin 25 a raised bump (not shown) is located on the engine side of the quick connect plate 17. When the ears 20 are aligned with and inserted into the ear slots 21 on the housing, the raised bump runs along the circular groove 22 of the housing 11 and mates into a detent (not shown) in the circular groove 22. The mating of the bump and detent prevents the quick connect plate 17 from rotating within the circular groove 22 and being released from the housing. This safety feature is very valuable in the event that the ATV engine stalls and kicks back, otherwise forcing the quick connect plate 17 to be disengaged from the housing. In a preferred embodiment, the quick connect plate 17 is turned counterclockwise within the circular groove 22, the direction of engine rotation.

In a preferred embodiment the power transfer unit comprises a hydraulic pump. The power transfer assembly receives rotational energy from the engine shaft to the hydraulic pump at a first end of the assembly 26 and hydraulic fluid is then discharged under pressure by the hydraulic pump, wherein the hydraulic fluid flows through a hydraulic circuit to power a hydraulic motor on an implement located at a second end of the assembly 29.

Figure 2:
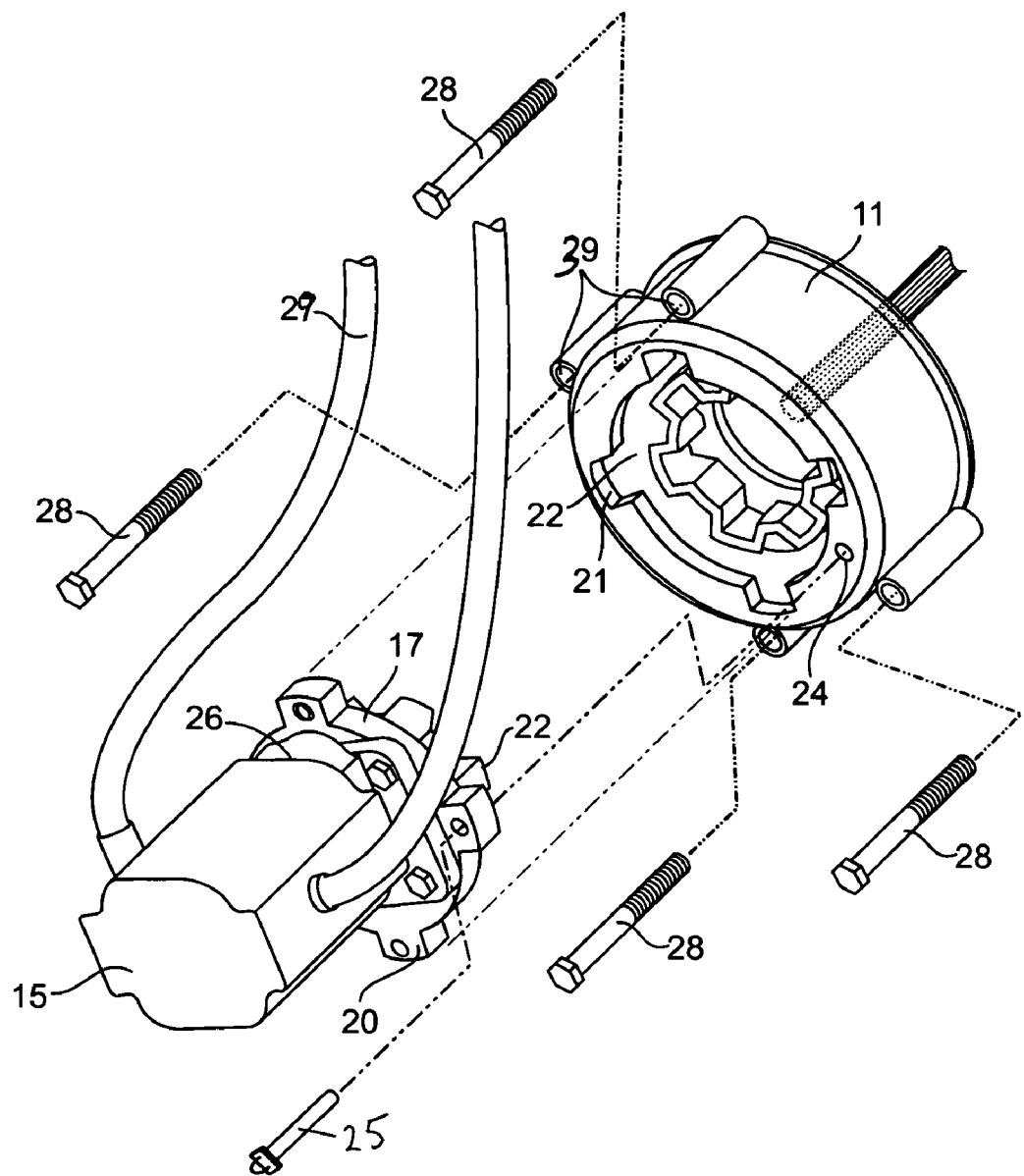
FIG. 2 is a partially see through view of an embodiment of the invention partially assembled

As is shown in FIGS. 2 and 3, the assembly is adapted for retrofit installation by removing an existing auxiliary starter 30 that is mounted on the engine (not shown) and once the auxiliary starter is removed, connecting the housing 11 to the engine casing via bolts 28 and the bolt holes 39 associated with the existing auxiliary starter 30. The driving assembly A and the driven assembly B being releasably connected with protruding ears 20 on the quick connect plate 17 and ear slots 21 on the housing 11.

The preferred housing 11 substantially encloses the drive plate assembly 12, 13 and has an opening on an outward-facing side thereof that provides access to the first slip joint coupler 13 on the engine-facing side of the drive plate assembly to receive the second slip joint coupler 16 on the outward-facing side of the drive plate assembly 12, 13. In a preferred embodiment, the drive plate 12 is made of metal and the first slip joint coupler 13 is made of a polymer, e.g. nylon.

The quick connect assembly 10 is adapted to be retrofitted in place of an existing auxiliary starter 30. In a preferred embodiment, the auxiliary starter 30 includes an auxiliary starter adapter (not shown) and is adapted to be coupled to the engine case by turning the adapter within the circular groove 22 located in the housing 11.

The power transfer assembly is disengaged from the ATV 40 by removing the locking pin 25 and rotating the quick connect plate 17 clockwise so that the ears 20 align with the ear slots 21 on the housing 11 and the quick connect plate 17 can be removed out of the housing 11.

Figure 4:
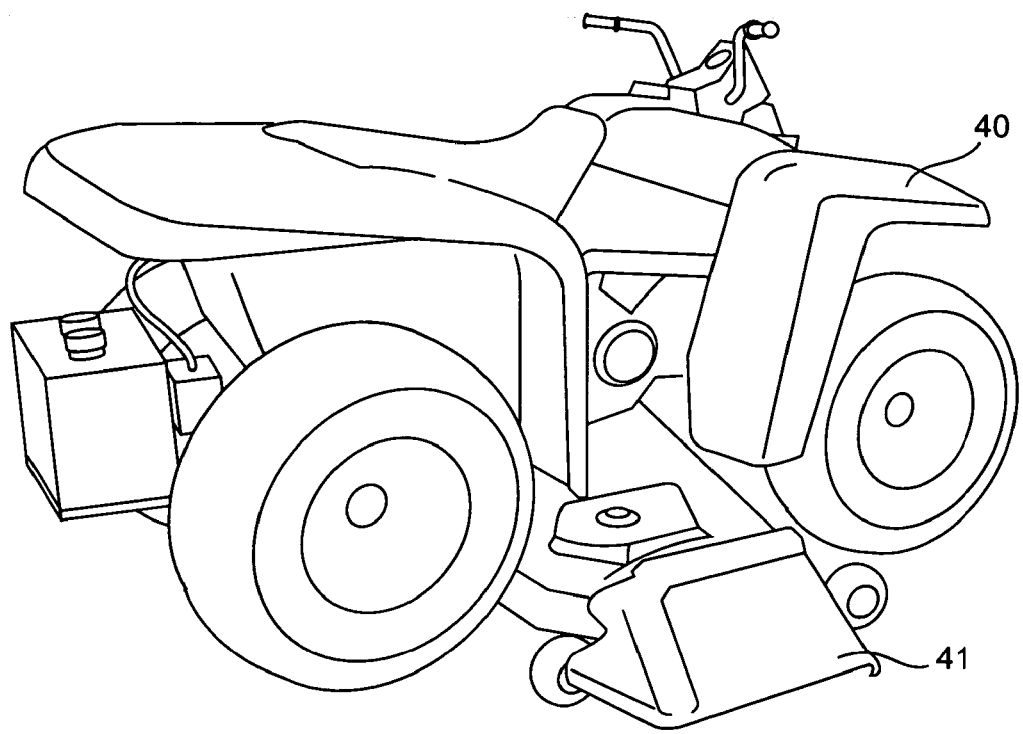
FIG. 4 is a side view of an ATV mower deck implement mounted onto an ATV.

FIG. 4 shows an implement connected to the ATV 40 having the ability to be powered by the quick connect assembly 10. The quick connect assembly is adapted to be used on ATV 40 implements including but not limited to a lawn mower 41, water sprayer, electric generator, wood chipper, snow blower, and a log splitter.

Figure 5:
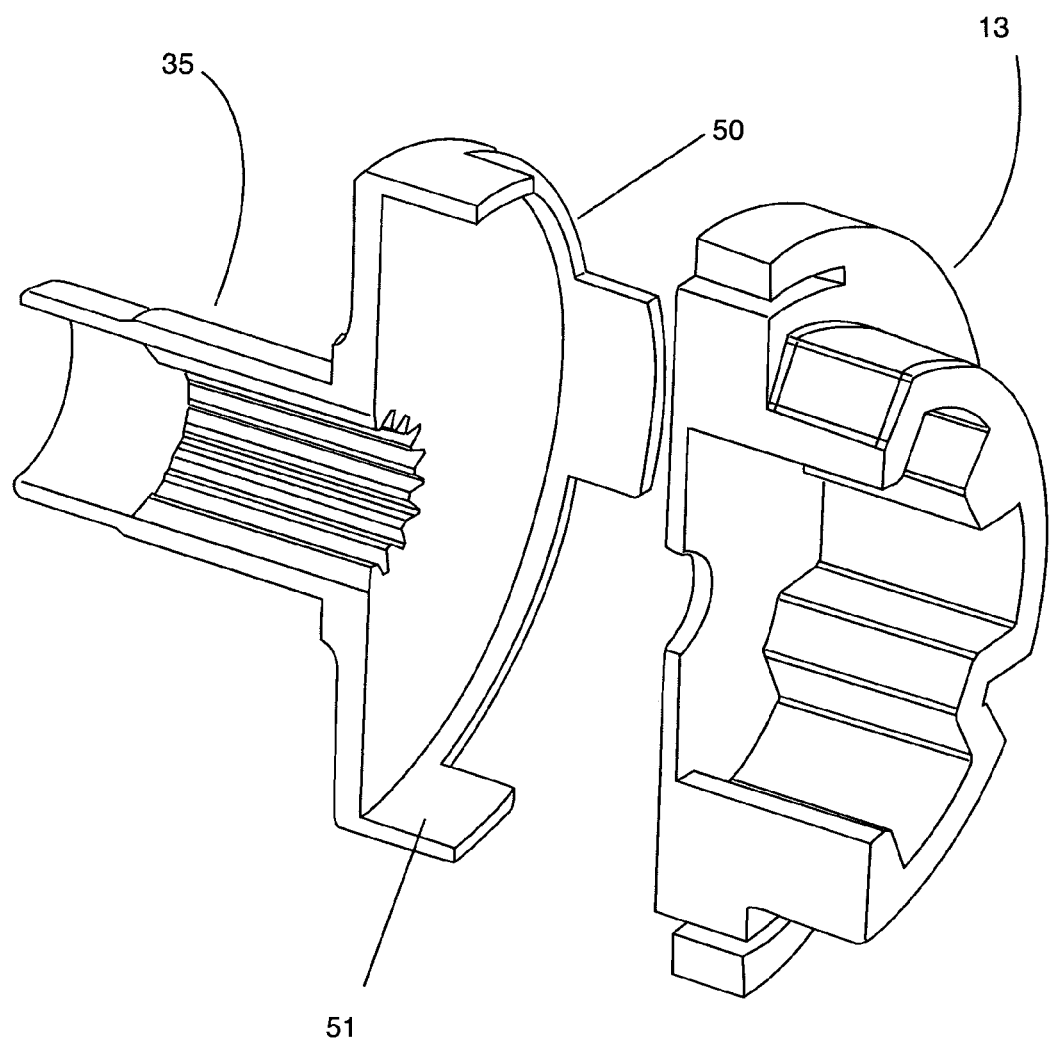
FIG. 5 is a cross sectional view of one embodiment of the drive plate assembly.

FIG. 5 shows a cross-sectional view of another embodiment of the crankshaft and drive plate assembly. In another embodiment, the drive plate coupler 13 can rest against a metal crown 50 that is attached to the ATV end of the crankshaft 35, and works in place of the disc plate 12. The metal crown 50 already being in place when an auxiliary starter 30 on the ATV engine is removed. The metal crown 50 includes at least one protruding flange 51, wherein the drive plate coupler 13 can be adapted to fit onto the crown 50, eliminating the need for the drive plate 12.

The preferred embodiment also encompasses a method of retrofitting an implement onto an all-terrain vehicle ATV 40, comprising: disconnecting an existing auxiliary starter 30 from the ATV 40; releasably fixing a drive plate 12, drive plate coupler 13 and housing 11 to an ATV 40 engine; inserting a quick connect plate 17 having a body and protruding ears 20 extending from the body into ear slots 21 located on the peripheral of the housing 11, the quick connect plate 17 being attached to a power transfer unit 15 on an outward-facing side thereof and to a second slip joint coupler 16 on an engine-facing side thereof, rotating the quick connect plate 17 in a circular groove 22 located within the housing 11 on an outward-facing side thereof.

The quick connect plate 17 includes a first locking aperture 23 that while axially engaged with the housing 11 is aligned with a second locking aperture 24 located on the housing 11 and outwardly from the circular groove. The first and second locking apertures 23, 24 are adapted to receive a locking pin 25.

Many alterations and modifications may be made by those having ordinary skill in the art without departing from the spirit and scope of the invention. For example, although in the preferred embodiment, the housing 11 is a cylindrical shape, the housing 11 can take the form of any shape that can be retrofitted onto an existing auxiliary starter 30. The housing 11 can be made of metal, or from a suitable injection molded polymer. The power transfer unit can be any power transfer unit, including but not limited to a hydraulic pump or pulley system.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A method of retro-fitting an implement onto an all-terrain vehicle (ATV), the method comprising:
    disconnecting an existing auxiliary starter from the ATV;
    fixing a drive plate, drive plate coupler and housing to an ATV engine;
    inserting a quick connect plate having a body and protruding ears extending from the body into ear slots located on the peripheral of the housing, the quick connect plate being attached to a power transfer assembly on an outward-facing side thereof and to a slip joint coupler on an engine-facing side thereof; and
    rotating the quick connect plate in a circular groove located within the housing on an outward-facing side thereof.

2. The method of claim 1, wherein the power transfer assembly is a hydraulic pump.

3. The method of claim 2, wherein the hydraulic pump is connected to a crankshaft at an input end, and connected to a hydraulic motor on an implement at an output end.

4. The method of claim 1, wherein the quick connect plate includes a first locking aperture located on the body that while axially engaged with the housing is aligned with a second locking aperture located on the housing and outwardly from the circular groove.

5. The method of claim 4, wherein the first and second locking apertures are adapted to receive a locking pin.

6. The method of claim 1, wherein rotational energy is transferred from the ATV engine to the hydraulic pump at a first end of the power transfer assembly and hydraulic fluid is then discharged under pressure by the hydraulic pump, wherein the hydraulic fluid flows through a hydraulic circuit to power a hydraulic motor on an implement at a second end of the power transfer assembly.

* * * * *